United States Patent [19]

Hess

[11] Patent Number: 4,688,083
[45] Date of Patent: Aug. 18, 1987

[54] CIRCUIT ARRANGEMENT FOR MATRIXING THREE CHROMA SIGNALS TO OBTAIN COLOR DIFFERENCE AND A LUMINANCE SIGNAL

[75] Inventor: Heinz Hess, Weiterstadt, Fed. Rep. of Germany

[73] Assignee: Robert Bosch GmbH, Stuttgart, Fed. Rep. of Germany

[21] Appl. No.: 875,610

[22] Filed: Jun. 18, 1986

[30] Foreign Application Priority Data

Jun. 27, 1985 [DE] Fed. Rep. of Germany ....... 3522986

[51] Int. Cl.$^4$ .............................................. H04N 9/67
[52] U.S. Cl. ........................................ 358/30; 358/27
[58] Field of Search ............................. 358/27, 30, 50

[56] References Cited

U.S. PATENT DOCUMENTS 4,023,200  5/1977  Hess ...................................... 358/30
4,553,141  11/1985 Flasza ..................................... 358/27

FOREIGN PATENT DOCUMENTS 2413025  7/1977  Fed. Rep. of Germany .
1461221  1/1977  United Kingdom .

Primary Examiner—Michael A. Masinick
Attorney, Agent, or Firm—Frishauf, Holtz, Goodman & Woodward

[57] ABSTRACT

To control the amplitude of color difference signals (R-Y, B-Y), a circuit is formed by two transistors each receiving matrixed color difference signals at their emitters, the base electrodes of one of the transistors (14, 16) being connected to a source of reference voltage and the base electrodes of the other of the transistors (13, 15) being connected to a common controlled source of voltage ($U_G$, 18) The color difference signals are then available at the collectors of the second transistors (13, 15) under controlled conditions.

4 Claims, 1 Drawing Figure

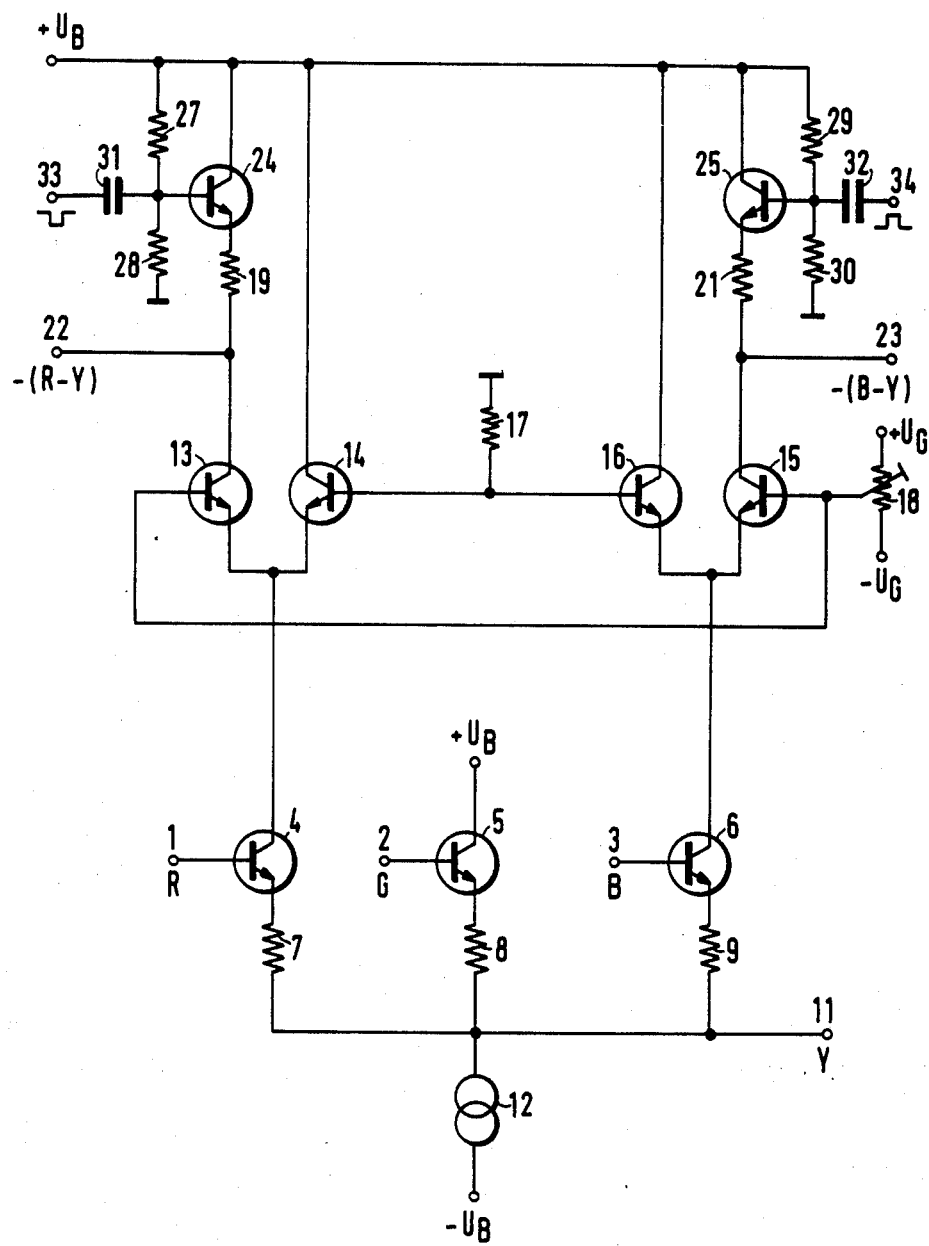

CIRCUIT ARRANGEMENT FOR MATRIXING THREE CHROMA SIGNALS TO OBTAIN COLOR DIFFERENCE AND A LUMINANCE SIGNAL

Reference to related publication by the inventor hereof, assigned to the assignee of the present invention: German Pat. No. 24 13 025.

The present invention relates to color television circuitry, and more particularly to a circuit to obtain color difference signals and a luminance signal from three chroma signals.

BACKGROUND

Chroma signals derived, for example, from a pick-up tube, a magnetic tape, or the like, usually provide three signals R, G, B (red, green, blue). A matrix circuit is used to provide color difference signals (R-Y) and (B-Y) and a luminance signal (Y). Three transistor stages may be used in such a circuit.

German Pat. No. 24, 13 025, by the inventor hereof, describes a circuit of this type.

THE INVENTION

It is an object to improve a matrix circuit which has the ability to adjust the amplitude of the generated color difference signals.

Briefly, color difference signals are generated by applying chroma signals, R, G, B to the control electrodes of three transistor stages which are connected to matrixing resistors and to a constant current source, to obtain color difference signals and the luminance signal. In accordance with a feature of the invention, two further transistor stages, each including two transistors, have their emitters connected together, and to the respective outputs of the color difference signals of the first transistor stages. One of the transistors of the two-transistor stages has its control electrode coupled to a source of reference voltage, whereas the other transistor has its control electrode connected to a source of adjustably selected controlled voltage. The controlled transistor of the pair then provides the respective color difference signal at its output.

The circuit has the advantage that the amplitude of the color difference signal can be easily controlled. The control may be direct, for example by an adjustment knob, screwdriver control of a potentiometer, or can be remote.

In accordance with a preferred feature of the invention, the transistors for matrixing the color signal as well as for setting of the amplitude are all coupled on a common integrated circuit, thereby insuring optimal synchronous operation of the color difference signals and avoiding hue or color tone errors due to affecting non-uniformly the amplitude of the respective color difference signals.

DRAWING the single FIGURE is a schematic diagram of the circuit of the present invention.

DETAILED DESCRIPTION

Three transistor stages 4, 5, 6 receive, at repsective control terminals 1, 2, 3 the three chroma signals R, G, B from a source of chroma signals. They convert the signals, by matrixing, in a color difference signal R-Y, a second color difference signal B-Y and a luminance signal Y. The color signals of red, green and blue (R, G, B) at terminals 1, 2, 3 are, preferably, connected to the base electrodes of the respective transistors 4, 5, 6 of the first, second and third transistor stage. Transistors 4, 5, 6 are connected over respective emitter-resistors 7, 8, 9 with a common output terminal Y which provides the luminance signal. The common output terminal Y is, additionally, connected to a constant current source 12. The matrixing resistors 7, 8, 9 have conductance values proportional to the matrix coefficients $k_1 = 0.30$, $k_2 = 0.59$ and $k_3 = 0.11$. The collector currents of the transistors 4 and 6 correspond to the color difference signals R-Y and B-Y, respectively. The collector electrode of transistor 5 is connected directly to a source of operating potential $+U_B$.

The color difference signal currents, corresponding to R-Y and B-Y are connected to a circuit for amplitude adjustment thereof. This circuit, essentially, is formed by two transistors each. Transistors 13, 14 are provided for the R-Y signal, and transistors 15, 16 for the B-Y signal. The emitter electrodes of the respective transistor pairs 13, 14 and 15, 16 are connected together and to the respective collector electrode of the transistors 4 and 6. The bases of the transistors 14, 16 are connected directly and via a resistor 17 to a reference voltage. The collector electrodes of the transistors 14, 16 are connected directly to the positive supply voltage $U_B$. The base electrodes of the transistors 13, 15 are also connected together and, in accordance with a feature of the invention, to the tap point of a controlled resistor 18, which is connected between a source of voltage, preferably stabilized, and shown schematically by terminals $+U_G$ and $-U_G$.

The collector electrodes of the transistors 13, 15, controlled by the voltage from the voltage divider potentiometer 18, are connected via respective collector resistors 19, 21 to a switching or strobing stage. The respective color difference signals, $-(R-Y)$ and $-(B-Y)$ are available from the junction between the collectors of transistors 13, 15 and the respective resistors 19, 21, as shown on the drawing.

OPERATION

The controlled voltage applied to the base electrodes of the transistors 13, 15, determined by the setting of potentiometer 18, forming a voltage divider, will set the amplitudes of the matrixed color difference signals. In accordance with a feature of the invention, the transistors 4, 6, 13, 14, 15 and 16 are located on a common integrated circuit, which insures optimum synchronous operation and uniformity of the color difference signals, and thus avoiding hue and color tone errors which might occur upon non-uniform amplitude control of the respective color difference signals.

The color difference signals R-Y and B-Y are modulated, as known, by coding of pulses for color synchronous operation.

The amplitude of the color synchronization signal is transmitted independently of the desired color saturation with constant amplitude. The collector resistors 19, 21 and the transistor stages 24, 25 connected between the operating voltage supply $U_B$ insure the constant amplitude of the color synchronization signal. The base electrodes of the transistors 24, 25, shown schematically to illustrate respective transistor stages, are connected between a voltage divider 27, 28 and 29, 30, respectively, connected between reference voltage and supply voltage $U_B$. Capacitors 31, 32, connected to input terminals 33, 34, respectively, couple respective negative and positive input pulses to the transistor stages 24, 25.

Potentiometer 18 is shown schematically; rather than providing a d—c voltage or controlled voltage $U_G$, a control video signal could be applied to the potentiometer 18, derived, for example, from the luminance signal of the video signal source. This permits introduction of signal-dependent changes in saturation, for example darkness saturation. It is also possible for example to mix foreground and background signals of two video signal sources—see German Pat. No. 31 43 653—to desaturate the foreground signals at the transition to the background signal.

I claim:

1. Circuit for matrixing three chroma signals (R, G, B) to obtain color difference signals (R-Y) and (B-Y) and a luminance signal (Y), said circuit having three transistor stages (4, 5, 6), each transistor stage having a chroma signal applied to a control electrode of the respective stage;

a matrixing resistor (7, 8, 9) connected to one of the main current electrodes of each transistor stage, and further connected, in common, to a common terminal, said common terminal being connected to a constant current source, whereby the luminance signal (Y) is available at said common terminal (11) and the current difference signals are available at the other main current electrodes of the transistor stages associated with that color which is to form the color difference signal, and comprising, in accordance with the invention, two further transistor stages, each including two further transistors (13, 14; 15, 16) having their emitters connected together, said connected emitters being connected to and controlled by the respective other main current electrodes of the first transistor stages (4, 6);

and a circuit arrangement to provide for amplitude control of the color difference signals comprising means (17) for connecting a first transistor (14, 16) of each of said two further transistors to a source of reference voltage, means for connecting a second transistor (13, 15) of each of said two further transistors to a source ($U_G$, 18) of controllable voltage;

means for connecting one (14, 16) of the further transistors of said two further transistor stages to a source of supply voltage ($U_B$); and means (22, 19, 24, 33; 23, 21, 25, 34; $U_B$) for deriving said color difference signals (R-Y; B-Y) from the other (13, 15) of the further transistors of said two further transistor stages.

2. Circuit according to claim 1, wherein said means for deriving said color difference signals includes a pulse control adding circuit connected to the collectors of said other of the further transistors of the two further transistor stages.

3. Circuit according to claim 2, wherein a third transistor (24, 25) is connected between a source of supply voltage (+$U_B$) and a collector resistor (19, 21) of said other (13, 15) of the further transistors of the two further transistor stages, and means (33, 34) for applying control pulses to the bases of said third transistors.

4. Circuit according to claim 1, wherein at least the transistor stages (4, 6) associated with the colors which are to form the color difference signals of the matrix as well as the transistors (13, 14; 15, 16) of the further transistor stages form part of a single integrated circuit.

* * * * *